United States Patent
Echavarri et al.

(10) Patent No.: US 7,415,080 B2
(45) Date of Patent: Aug. 19, 2008

(54) METHOD AND APPARATUS FOR DETECTING DATA SEQUENCES

(75) Inventors: Javier Echavarri, Viczcaya (ES); Robert Barnard Heaton, Aldershot (GB)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 731 days.

(21) Appl. No.: 10/210,103

(22) Filed: Aug. 2, 2002

(65) Prior Publication Data

US 2003/0067999 A1 Apr. 10, 2003

(30) Foreign Application Priority Data

Aug. 2, 2001 (EP) .................................. 01306645

(51) Int. Cl.
*H03D 1/00* (2006.01)
(52) U.S. Cl. .................. 375/343; 375/342; 375/354
(58) Field of Classification Search ............. 375/354, 375/342, 343
See application file for complete search history.

(56) References Cited

U.S. PATENT DOCUMENTS

| 5,282,227 | A |   | 1/1994 | Crawford |         |
|-----------|---|---|--------|----------|---------|
| 5,758,277 | A | * | 5/1998 | Hawkes   | 455/410 |
| 6,064,695 | A | * | 5/2000 | Raphaeli | 375/230 |
| 6,141,373 | A | * | 10/2000| Scott    | 375/150 |
| 6,674,817 | B1| * | 1/2004 | Dolle et al. | 375/342 |
| 6,785,350 | B1| * | 8/2004 | Poulbere et al. | 375/343 |
| 2002/0065047 | A1 | * | 5/2002 | Moose | 455/63 |
| 2004/0052319 | A1 | * | 3/2004 | Wakamatsu | 375/343 |

FOREIGN PATENT DOCUMENTS

WO   WO-0059147   10/2000

OTHER PUBLICATIONS

IEEE 802.11a standard "Wireless LAN Medium Access Control (MAC) and Physical Layer (PHY) Specifications, High-speed Physical Layer in the 5 GHz Band",IEEE 1999, pp. 1-13.*
IEEE 802.11a standard "Wireless LAN Medium Access Control (MAC) and Physical Layer (PHY) Specifications, High-speed Physical Layer in the 5 GHz Band",IEEE 1999, pp. 24-26.*

* cited by examiner

*Primary Examiner*—Mohammad H. Ghayour
*Assistant Examiner*—Juan A. Torres
(74) *Attorney, Agent, or Firm*—Birch, Stewart, Kolasch & Birch, LLP

(57) ABSTRACT

A method of detecting a predetermined complex data sequence in a received signal, representing for example a broadcast burst preamble in a wireless LAN transmission, involves (a) performing an auto-correlation on the data extracted from the received signal to provide an auto-correlation output, (b) combining the auto-correlation output with a delayed version of the auto-correlation output to produce a combined output and (c) providing a signal representing the predetermined data sequence if the combined output meets a predetermined condition, preferably also taking into account the phases of the auto-correlation output.

14 Claims, 7 Drawing Sheets

US 7,415,080 B2

METHOD AND APPARATUS FOR DETECTING DATA SEQUENCES

FIELD OF THE INVENTION

This invention relates to a method and an apparatus for detecting sequences of transmitted data, and is particularly, but not exclusively, applicable to wireless local area networks (LAN's) in which signals are transmitted in bursts, each of which is preceded by a known data pattern, or preamble, and which are detected by receivers and used for synchronisation purposes. Examples of such systems are HIPERLAN/2, MMAC and IEEE 802.11a. The invention will be described primarily in the context of HIPERLAN/2 systems, but it is applicable also in other areas.

BACKGROUND OF THE INVENTION

HIPERLAN/2 (see for example "HIPERLAN/2—The Broadband Radio Transmission Technology Operating in the 5 GHz Frequency Band", by Martin Johnson, HIPERLAN/2 Global Forum 1999, v.1.0) is a centrally controlled time-division multiple access, time-division duplex (TDMA/TDD) system with the capability of sending data from a central access point (AP) to mobile terminals (MT's), receiving data from the MT's and synchronising the transmission of data directly between the MT's. The AP transmits bursts of data in the form of medium access control (MAC) frames, each of which comprises individual sections. The first individual section is a broadcast channel (BCH) section. It is important for the MT's to be able to recognise a BCH section quickly after the start of operation, so that they can synchronise their operation to the AP. For this purpose, the BCH section has, at the beginning, a preamble formed by a unique sequence of complex data. Other sections within the frame also include identifying preambles comprising different data sequences.

An individual preamble can be recognised by feeding the received data to a filter which is matched to the known complex data pattern.

However, it would be desirable to provide an improved technique for preamble detection which gives more reliable results even under extreme radio channel signal conditions exhibiting noise, multi-path interference and clipping. It would also be desirable to provide a technique which can readily be adapted for detecting different kinds of data sequences.

BRIEF SUMMARY OF THE INVENTION

Aspects of the present invention are set out in the accompanying claims.

According to a further aspect of the invention, received data is subjected to auto-correlation. This will provide an output which changes in the time domain in accordance with the received data. Respective parts of the output are combined by summing the auto-correlation output with another version of the output which has been delayed by a predetermined amount. In this way, distinctive features of the auto-correlation output can be combined, e.g. summed, to provide enhanced distinction from other data patterns.

In the preferred embodiment, the phase of the auto-correlation output is also taken into account in assessing whether the received data corresponds to a predetermined pattern. The system may be arranged to take into account the phase of the auto-correlation output at times separated by a predetermined amount, possibly the same predetermined delay amount which is used to produce the delayed auto-correlation output.

The system is particularly applicable to the detection of data sequences which comprise (at least) two periods, each of which gives rise to a peak in the auto-correlation output. By delaying the auto-correlation output by an amount or amounts corresponding to the delay or delays between the peaks, and combining the delayed auto-correlation output(s) with the current auto-correlation output, it is possible to derive an output signal in which the peaks are summed and therefore readily detected.

Each individual period preferably includes sub-sequences of data which are identical to the other sub-sequences, or inversely related to the other sub-sequences, within the same period. This will give rise to significant auto-correlation values; preferably, the modulus of the auto-correlation output is used so that positive peaks are provided irrespective of whether sub-sequences are correlated with either the same or inverted sub-sequences.

A state machine can be used to detect the conditions representative of a pre-defined data pattern. In the preferred embodiment, the state machine can be reconfigured to detect other, different data patterns.

An arrangement embodying the invention will now be described by way of example, with reference to the accompanying drawings, in which:

DETAILED DESCRIPTION OF THE INVENTION

Figure 1:
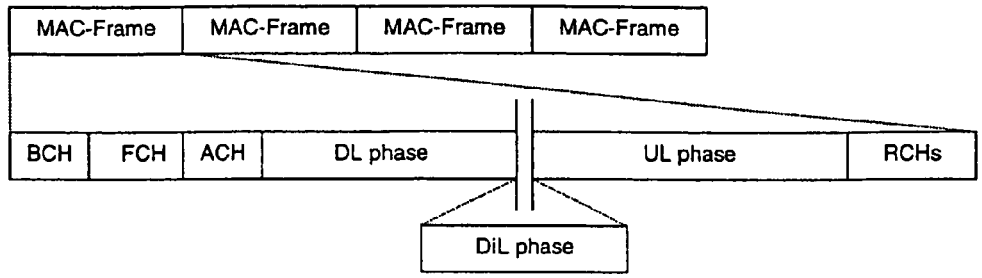
FIG. 1 illustrates the structure of a MAC frame transmitted using a HIPERLAN/2 system.

HIPERLAN/2 is a centrally controlled TDMA/TDD system with up-link, down-link and direct-link (i.e. data not needing to be relayed through the centre) burst timing all being controlled by the central Access Point (AP). Data is transmitted in medium access control (MAC) frames. All frame times are defined relative to a Broadcast Channel (BCH) burst, which is transmitted by the AP at the beginning of every new frame. FIG. 1 shows the frame structure for an AP with an omni-directional antenna.

Broadcast Channel (BCH), Frame Channel (FCH), Access feedback Channel (ACH) and down-link (DL) data are all transmitted as a single contiguous RF burst from the AP, but the individual sections are mapped on to separate data bursts that each have their own format and preamble. The remainder of the frame is used for transmissions by the Mobile Terminals (MT's). It is divided into three sections or phases: for Direct link (DiL) traffic (optional), up-link (UL) data from MT's to AP, and a random access channel (RCH) for requests to the AP to allocate resources to MT's that are not currently active.

The BCH, FCH and ACH channels are concatenated to form a single broadcast data burst. The DL data form a down-link burst. There are two different kinds of uplink bursts which can be used for the UL phase: up link bursts with short preambles (USCH) and uplink bursts with long preambles (ULCH). There is also an optional direct link burst for the DiL data.

The format is different for AP's with multiple antenna sectors. In this case each section of the frame comprises n data bursts, one for each antenna sector. Also, each broadcast burst includes only the BCH data. The FCH and ACH data are concatenated and transmitted as a downlink burst.

Independently of the burst type each data burst consists of two sections: preamble and payload. Each burst is started with a preamble section, $r_{PREAMBLE}$, which is followed by a payload section, $r_{PAYLOAD}$, and its baseband format is $$r_{BURST}(t) = r_{PREAMBLE}(t) + r_{PAYLOAD}(t - t_{PREAMBLE})$$

Figure 2:
FIG. 2 is a diagram showing the basic structure of a section within a MAC frame.

The time offset $t_{PREAMBLE}$ determines the starting point of the payload section of the burst and depends on the burst type. The basic structure of a data burst is illustrated in FIG. 2.

The payload section is made up of 52-carrier orthogonal frequency division multiplex (OFDM) symbols generated by a 64-point inverse Discrete Fourier Transform (IFT) with a cyclic prefix (CP) of 16 (mandatory) or 8 (optional) samples as indicated in Table 1.

The sub-sequences within a section type A each comprise a predetermined sub-sequence of 16 complex data samples, or the sign-inverse of these data samples (the term "sign-inverse" meaning that the signs of both the real and imaginary parts of the respective samples are the opposite of the signs of the corresponding samples of the basic data sequence). Within a section of type A, each individual sub-sequences of data is referred to as A, or, if it comprises sign-inverse samples, as IA. There are five sub-sequences, the total length being 4 μs, equivalent to one OFDM symbol.

The sub-sequences within a section type B each comprise a predetermined sub-sequence of 16 complex data samples B, or the sign-inverse IB of these data samples. There are either five or ten sub-sequences, producing a length of 4 or 8 μs, equivalent to one or two OFDM symbols.

A section type C has a length equal to two full OFDM symbols and comprises two sub-sequences each containing complex data samples C plus a preceding sub-sequence in the form of a cyclic prefix (CP) which is a copy of the last part of the C sub-sequence.

Only the broadcast burst has a preamble containing section type A, which is intended for frame synchronisation and must therefore uniquely identify the beginning of the first burst in the frame. Section type B is intended for timing, and fine frequency recovery. Section C type is intended for channel estimation. Section types B and C are also found in other preambles.

Figure 3:
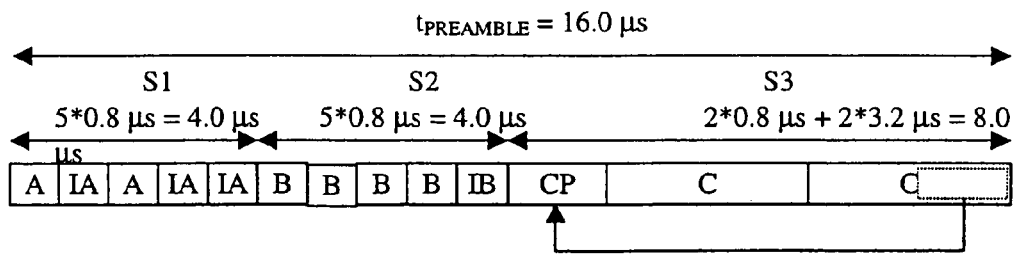
FIGS. 3 to 5 show the structures of different types of preambles used for respective types of sections of a MAC frame.

FIG. 3 shows the preamble for a broadcast burst, which includes three sections, of types A, B and C. Section type A of

TABLE 1

| Parameter | Value | | |
|---|---|---|---|
| Sampling rate $f_S = 1/T$ | 20 | MHz | |
| Useful symbol part duration $T_U$ | 64 | *T | |
| | 3.2 | μs | |
| Cyclic prefix duration $T_{CP}$ | 16 | *T | 8 *T |
| | 0.8 | μs (mandatory) | 0.4 μs (optional) |
| Symbol interval $T_S$ | 80 | *T | 72 *T |
| | 4.0 | μs ($T_U + T_{CP}$) | 3.6 μs ($T_U + T_{CP}$) |
| Number of data sub-carriers $N_{SD}$ | 48 | | |
| Number of pilot sub-carriers $N_{SP}$ | 4 | | |
| Total number of sub-carriers $N_{ST}$ | 52 | ($N_{SD} + N_{SP}$) | |
| Sub-carrier spacing $\Delta_f$ | 0.3125 | MHz ($1/T_U$) | |
| Spacing between the two outmost sub-carriers | 16.25 | MHz ($N_{ST} * \Delta_f$) | |

In the following description only the mandatory 16-sample CP is considered. Fine frequency offset and Fourier transform block timing may be tracked throughout the payload section of the burst using the delay-and-multiply auto-correlation technique proposed for DVB-T (Digital Video Broadcasting, Terrestrial) and ISDB-T (Integrated Services Digital Broadcasting, Terrestrial). However, as there are only 16 (or 8) samples of CP per symbol, it will be necessary to average over several symbols before these estimates are sufficiently accurate. The purpose of the preamble is to assist the initial acquisition process so that the first data symbol of the payload may be received with sufficient accuracy.

The data bursts have different preambles. There are three types of preamble sections which are used for constructing the preambles, section types A, B and C. Each preamble is made up of one, two or three sections of different types. Each section comprises multiple sub-sequences (or blocks) of data. Each sub-sequence comprises a set of samples.

the broadcast burst preamble is shown at S1 and may be generated by taking the 64-point IFT of a spectrum having modulated non-zero carriers only in positions ±2, ±6, ±10, ±14, ±18 and ±22. The resulting time domain waveform repeats after 32 samples and the second 16 samples (IA) are the sign-inverses of the first 16 (A). It may therefore also be generated simply by storing the first 16 samples (A) in a look-up table. The complete section S1 of 80 samples (4 μs) is generated by attaching a further copy of the inverted 16-sample waveform IA to the end of the 64-sample IFT block.

Section type B of the preamble is shown at S2 and may be generated by taking the 64-point IFT of a spectrum having non-zero carriers only in positions ±4, ±8, ±12, ±16, ±20 and ±24. The resulting time domain waveform repeats after 16 samples (B). It may therefore also be generated simply by storing the first 16 samples in a look-up table. The complete section S2 of 80 samples (4 μs) is generated by repeating the 16-sample sub-sequence B four times, followed by a sign-inverted copy IB of the 16-sample waveform.

Section S2 is then followed by a C-type section at S3.

Figure 4:
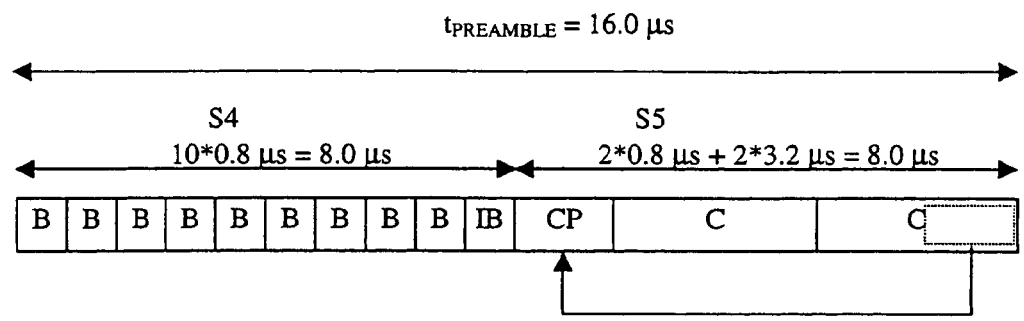

FIG. 4 shows the preamble for a ULCH burst. This comprises two sections S4 and S5, which are respectively section types B and C. The section type B is generated as in the broadcast burst, except that the 16-sample sub-sequence B is repeated 9 times before the sign-inverted waveform IB.

Figure 5:
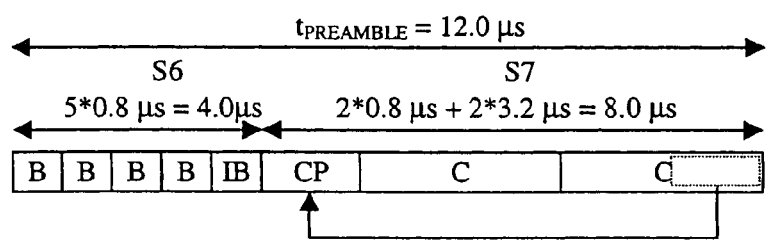

FIG. 5 shows the preamble for a USCH burst. This also has only two sections, S6 and S7, of types B and C, respectively. In this case, the type B section is the same as the B type section of the broadcast burst of FIG. 3.

The preamble for downlink bursts consists only of a section of type C, and the preamble for direct link bursts corresponds to the ULCH burst of FIG. 4.

Figure 6:
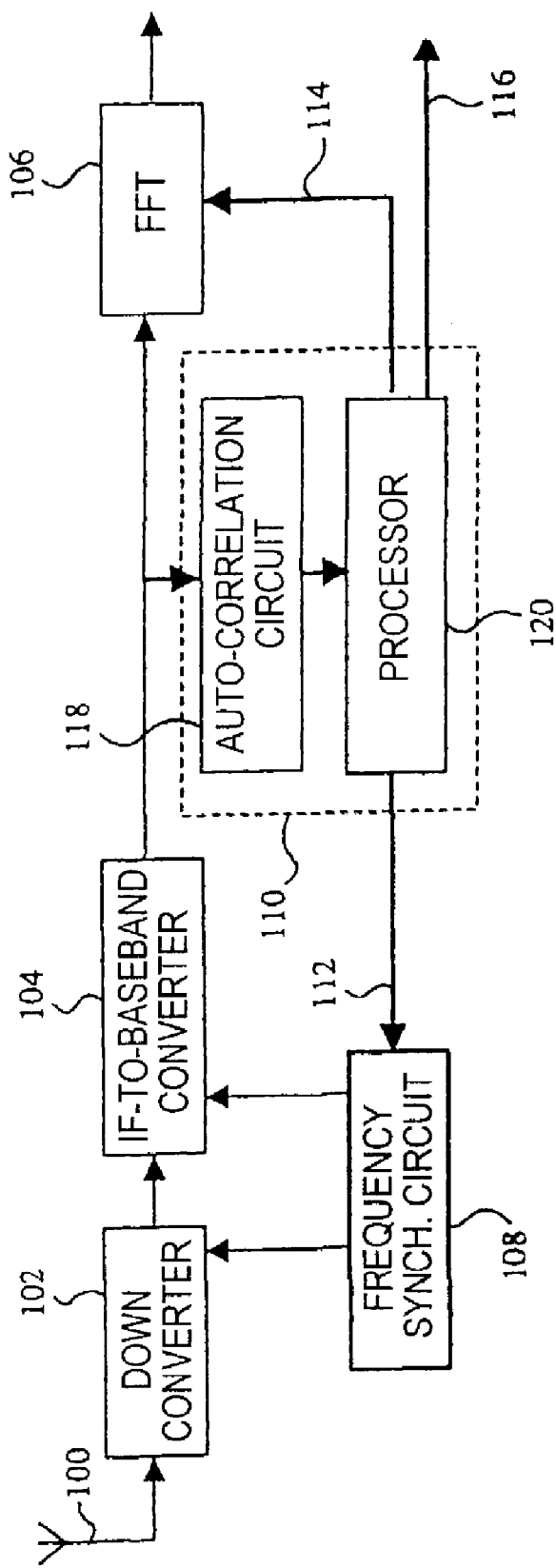
FIG. 6 is a block diagram of a wireless LAN receiver in accordance with the present invention.

Referring to FIG. 6, this is a block diagram of the receiving section of a wireless LAN transceiver. An antenna 100 is coupled to a down-converter 102 for demodulating the received signal and producing an intermediate frequency (IF) signal. The IF signal is passed to an IF-to-baseband converter 104 which produces at its output complex data samples which are delivered to a fast Fourier transform (FFT) circuit 106. Demodulated output data is produced by the FFT 106.

The down-converting operation and the IF-to-baseband conversion operation are controlled by a sampling clock generator and frequency synchronising circuit 108.

This arrangement is well known in the prior art for use in demodulating OFDM signals.

A preamble detection circuit 110 receives the complex data samples from the IF-to-baseband converter 104 and is arranged to detect predetermined data sequences forming different preambles and in response thereto to generate controlling signals. For example, by detecting the time at which a preamble is received, it is possible for the preamble detector 110 to estimate a timing error and in response thereto provide a value representing the error on lines 112 and 114 to the generator 108 and the FFT circuit 106. The detector 110 can also provide a "preamble detected" output on line 116.

The preamble detector 110 comprises an auto-correlation circuit 118 for auto-correlating the data samples received from the converter 104 and in response thereto generating various output values. The detector also comprises a processor 120 which receives the output values from the auto-correlator 118 and which includes a state machine for determining whether or not they are representative of a predetermined data sequence representing a preamble.

Figure 7:
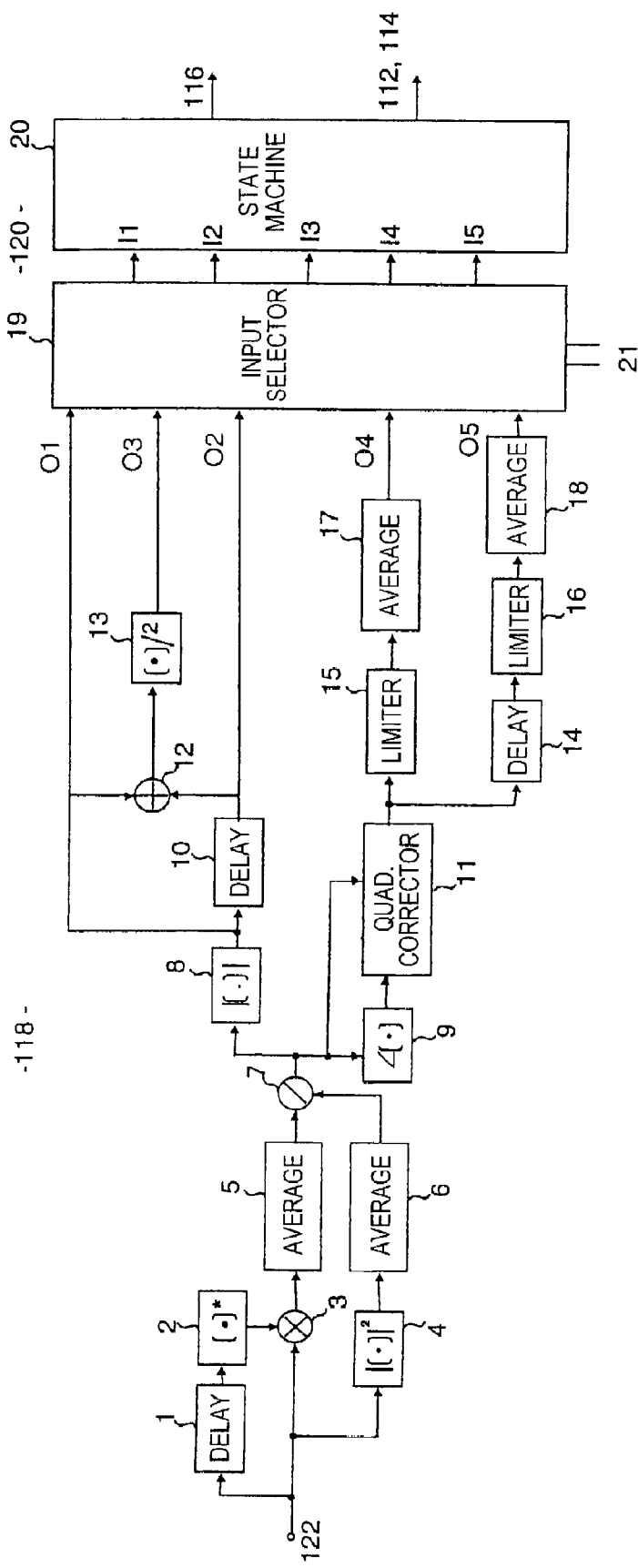
FIG. 7 is a block diagram of the preamble-detection part of the receiver.

Referring to FIG. 7, the auto-correlator 118 receives complex data samples at input 122. These are sent to a 16 sample delay circuit 1 and then to a conjugator 2, which forms a complex conjugate of the output of the delay circuit 1. A multiplier 3 multiplies the delayed complex conjugate with the input samples received from input 122 and produces an output representing an auto-correlation of the input to a moving average circuit 5. This produces at its output a signal representing a moving average of the auto-correlation output, the average being based on a sliding window of 48 samples.

The input data samples are also provided to a power detecting circuit 4, the output of which is delivered to a moving average circuit 6, which is also based on a sliding window of 48 samples. The output from the moving average circuit 5 is divided by the output from the moving average circuit 6 by divider 7, which thus produces an output Auto(n) representing the auto-correlation of the input normalised to the accumulated power of the signal:

$$Auto(n) = \frac{\sum_{i=0}^{L} r^*(n-i-D) \cdot r(n-i)}{\sum_{i=0}^{L} r^2(n-i)}$$

where: r(n)=complex input signal sample number n, D=delay (in samples) and L=length of sum in samples. The normalisation results in the peak of the auto-correlation output always being unity, i.e. '1'.

The output of the divider 7 is delivered to a circuit 8 which calculates the modulus of the auto-correlation function. The circuit 8 could be a programmable read-only memory (PROM). The modulus of the auto-correlation function |Auto(n)| is then provided by circuit 8 as a first output O1 of the auto-correlator 118.

Figure 8:
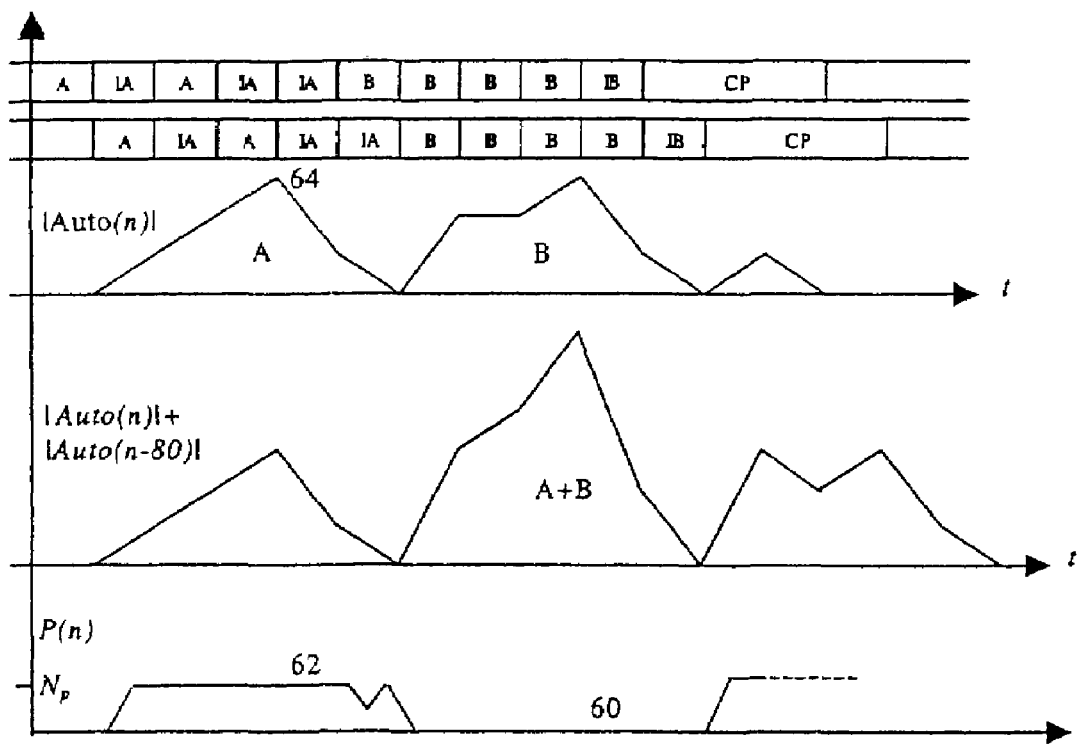
FIG. 8 is a chart showing various signals within the preamble-detection section when receiving the preamble of a broadcast burst.
Figure 9:
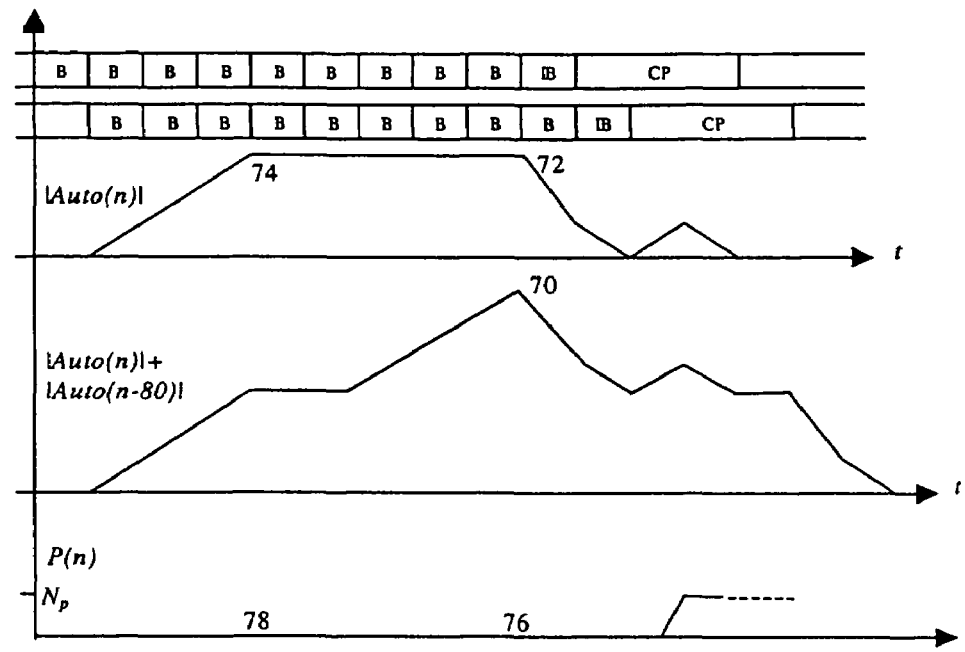
FIGS. 9 and 10 are charts similar to that of FIG. 8 but showing waveforms when receiving other types of preamble.
Figure 10:
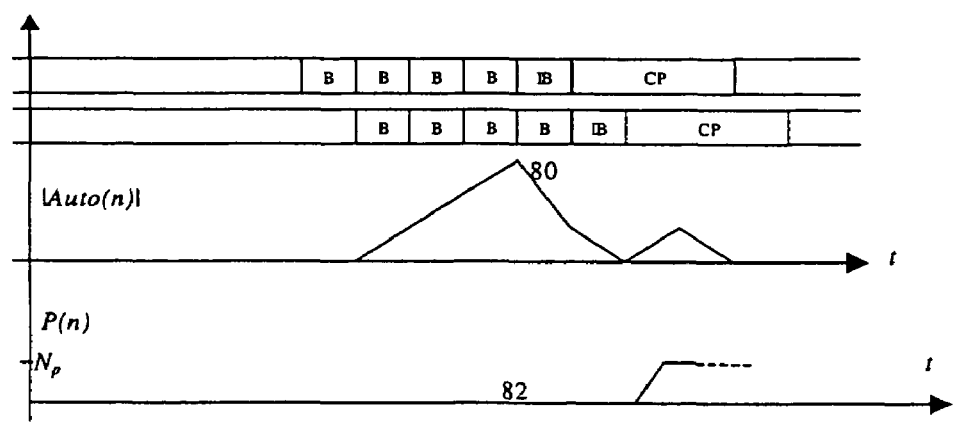

FIGS. 8 to 10 show, for respectively the broadcast burst, ULCH and USCH preambles, the input data samples, the delayed data samples and the modulus of the auto-correlation magnitude |Auto(n)|.

The modulus of the auto-correlation function is also fed to an 80-sample delay circuit 10, the output |Auto(n−80)| of which forms a second output O2 of the auto-correlator 118. The output signals are summed by an adder 12, the output (|Auto(n)|+|Auto(n−80)|)/2 of which is divided by 2 by a circuit 13 to form a third output O3 of the auto-correlation circuit.

FIGS. 8 and 9 show |Auto(n)|+|Auto(n−80)| for respectively the broadcast burst and the ULCH preambles. It will be noted that, for the broadcast burst, the separate A and B peaks in the |Auto(n)| waveform, resulting from the A and B sub-sequences, have been combined into a large, distinctive and more-easily detected A+B peak. Also, a substantial and distinctive peak is created for the ULCH preamble.

The complex data output of the divider 7 is also delivered to a phase angle calculator 9, which may also be a PROM. This calculates the phase angle of the auto-correlation function and delivers the result to a quadrant corrector 11. The quadrant corrector also receives the complex data samples from the divider 7, and by examining the signs of the real and imaginary parts determines the quadrant within which the phase angle occurs. The resulting corrected phase angle is then delivered to a limiter 15.

The limiter 15 operates according to the following equation:

$$L(n) = \begin{cases} 1 & |\angle Auto(n)| \geq \pi/2 \\ 0 & |\angle Auto(n)| < \pi/2 \end{cases}$$

where: ∠Auto(n)=phase output of auto-correlation circuit for sample n, L(n)=limiter output (and is either 1 or 0, depending on whether ∠Auto(n)< or >=π/2).

The output of the limiter 15 is fed to a moving average circuit 17, the output P(n) of which forms a fourth output O4 of the auto-correlation circuit 118. FIGS. 8 to 10 show this output P(n) for respectively the broadcast burst, ULCH and USCH preambles.

The output of the quadrant corrector 11 is also fed to an 80 sample delay circuit 14, and then to limiter circuit 16 and moving average circuit 18, which operate in the same manner as circuits 15 and 17 respectively, to produce output O5.

The moving average circuits 17 and 18 perform the following functions:

$$P(n) = \sum_{i=0}^{N_p} L(n-i)$$

$$P(n-80) = \sum_{i=0}^{N_p} L(n-80-i)_p$$

where: L(n)=input sample n, P(n)=output sample n and $N_p$=length of sliding integrator (8 is a typical figure). Two phase windows are thus observed at O4 and O5. The first one, P(n), comprises the limiter output of the current sample, L(n), and the limiter output for the previous i samples, with i=1 . . . $N_p$–1. The second window, P(n–80), consists of the limiter output of the $80^{th}$ previous sample, L(n–80), and of the output for the i+80 previous samples, with i=1 . . . $N_p$–1.

It is to be noted that P(n) is representative not of the phase of the instantaneous auto-correlation function, but of the phase of the sliding mean of the auto-correlation function (derived from moving average circuit 5). The length of the moving average (in this case 48 samples) significantly influences the size and location of the waveform P(n). Also, P(n) is itself based on a moving average of the phase output, derived by moving average circuit 17. Thus the shape and location of P(n) would be influenced by the characteristics of this circuit 17 and any delay which may be introduced by the circuit. Similar comments apply to the P(n–80) waveform.

The outputs O1 to O5 thus represent the following:

O1=|Auto(n)|

O2=|Auto(n–80)|

O3=(|Auto(n)|+|Auto(n–80)|)/2

O4=P(n)

O5=P(n–80)

The processor circuit 120 comprises an input selector 19 and a state machine 20. The input selector 19 receives the outputs O1 to O5 from the auto-correlator 118. The input selector also receives a configuration input on lines 21, which is used for selecting the preamble to be detected. The input selector couples the values received from outputs O1 to O5 to inputs I1 to I5 of the state machine 20 in different ways depending on the values of the signals at configuration inputs 21. The state machine 20 is operable to carry out a predetermined algorithm on the values received at inputs I1 to I5 in order to generate the timing error signal on lines 112, 114 and the preamble detection signal on line 116.

Figure 11:
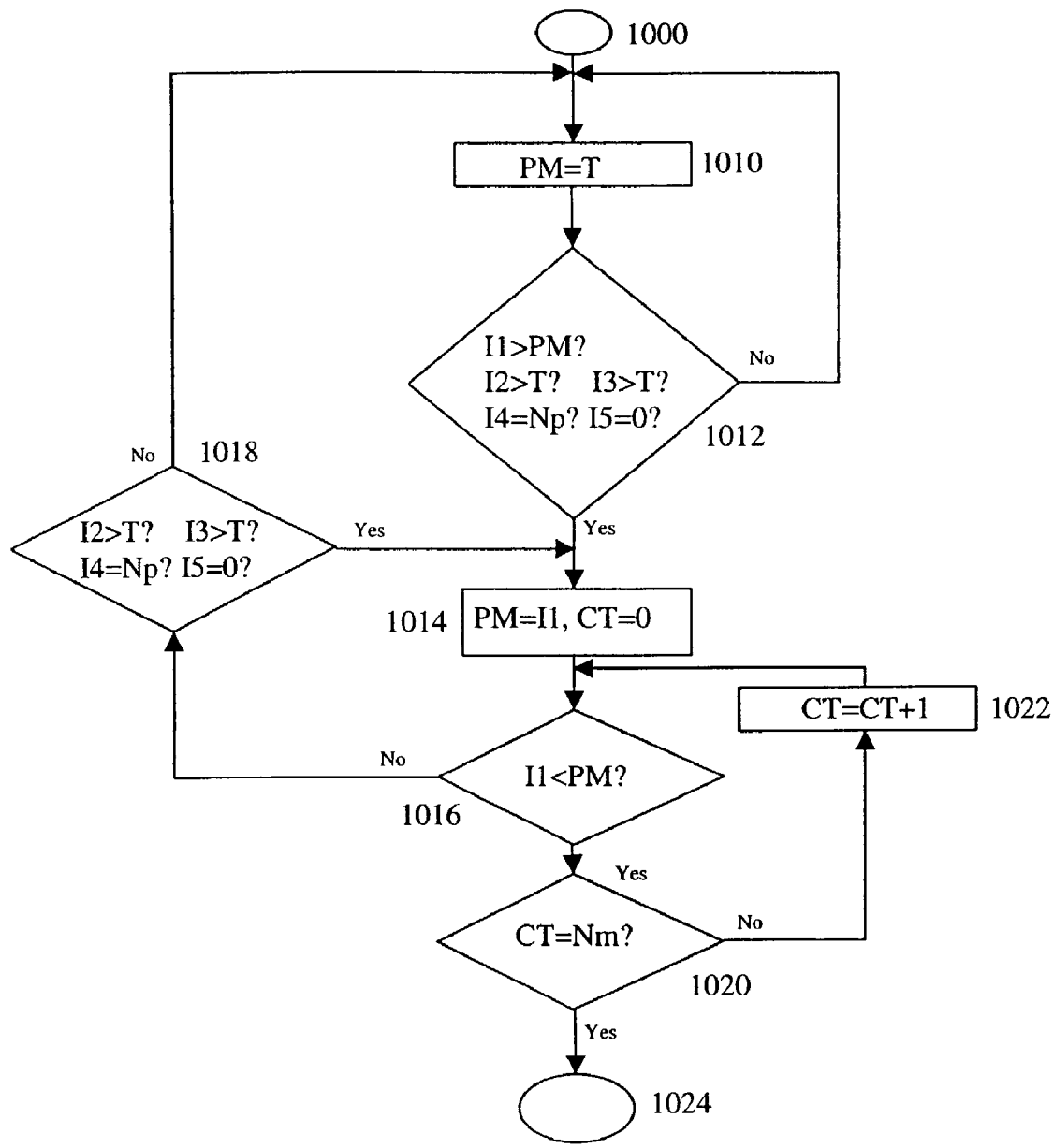
FIG. 11 is a flowchart showing the operation of a state machine in the preamble-detection part of the receiver.

The general operation of the state machine 20 will be described with reference to the flowchart of FIG. 11. The main function of preamble detection is achieved by determining when the input signal I1 has reached a peak under conditions representing the presence of a particular preamble type.

The state machine leaves a reset state at step 1000 when it is activated by detecting an input control window. At step 1010, an internal "previous maximum" variable PM is set equal to a predetermined threshold T. At step 1012, the state machine checks the values of a number of inputs. In particular, depending upon the preamble being detected, the state machine will check one or more of the values of the outputs O1 to O5 of the auto-correlation circuit 118. Unless certain conditions are met, the state machine then loops back to step 1010.

The conditions will be met when the variables being checked indicate that the magnitude and phase of the auto-correlation output, and/or the delayed auto-correlation output, suggest that a preamble of the appropriate type may be being received and a peak value of I1 may be being approached. When this occurs, the state machine moves from step 1012 to step 1014 and thus moves to the next state.

The conditions being checked are:

| | |
|---|---|
| I1>PM? | 1. |
| I2>T? | 2. |
| I3>T? | 3. |
| I4=Np? | 4. |
| I5=0? | 5. |

Tests 1 to 3 are used for checking auto-correlation magnitudes, and test 4 and 5 for auto-correlation phases.

At step 1014, the variable PM is set equal to the input value I1. An internal count variable CT is set equal to zero.

The state machine proceeds to step 1016 to check whether the variable I1 has become smaller than the variable PM. If it has not yet become smaller (that is if the input variable I1 is still increasing towards a peak) then the program proceeds to step 1018. At this step, the state machine checks that the values of the other variables (which were previously checked at step 1012) are still indicative of the correct conditions for detecting a peak. If so, the state machine returns to step 1014. Otherwise, the state machine returns to step 1010, so that it returns to its initial state of checking for appropriate conditions.

Assuming the appropriate conditions are maintained, the state machine passes through steps 1014, 1016 and 1018 until the value of the input variable I1 becomes less than the variable PM (i.e. until after the peak value of the variable I1 has been passed).

The state machine then proceeds to step 1020 to check whether the count variable CT is equal to a predetermined value $N_m$. If not, the program proceeds to step 1022, to increment the value of CT, and then reverts to step 1016 to check that the input I1 is still less than the variable PM. The machine continues in this state, looping through steps 1016, 1020 and 1022, until CT reaches the value $N_m$, at which point the state machine proceeds to step 1024, which indicates that the state machine has detected a peak which is of sufficient magnitude, and which occurs in the correct conditions, to represent a predetermined preamble.

At this point, the state machine 20 issues a peak detection signal on line 116, and an error signal on line 112 and 114. The error signal is representative of a timing error and is determined by the difference between the number of samples that have passed since the control window was activated and $N_m$.

The operation of the state machine for detecting a broadcast burst preamble of the type shown in FIG. 8 will now be described.

For detecting this preamble, the input selector 19 is set so that the inputs of the state machine 20 receive the following values:

I1=O3=(|Auto(n)|+|Auto(n–80)|)/2

I2=O2=|Auto(n–80)|

$I3 = 2 \times T$ $I4 = O5 = P(n-80)$ $I5 = O4 = P(n)$

Thus, at step 1012, test 3 will always be met. The other four tests will be met when the maximum value of the A+B peak (FIG. 8) is approached. It will be noted that, as this value is approached, the phase value P(n) is equal to 0, so that condition 5 is met, as shown at 60. The delayed phase value P(n−80) would have the value shown at 62, and therefore would meet condition 4. The delayed auto-correlation value |Auto(n−80)| would have the value shown at 64, and therefore would meet the condition 2. These conditions will be maintained until after the peak value has passed, and the state machine will thus reach step 1024 and provide a signal indicating the presence of the broadcast burst preamble.

The state machine 20 thus locates the peak by continually comparing the current sample with $N_m$ previous samples, making use of both magnitude and phase to start the operation. A provisional peak is detected when an auto-correlation output exceeds a given threshold in the correct phase condition. A new input is then compared with the provisional peak. If the new input is larger than the provisional peak, the new input becomes the provisional peak. The peak is detected when the provisional peak remains the largest, for a pre-defined number of samples and when the previous $N_p$ phase samples are within a selected tolerance, i.e. if the phase is correct, according to the relevant standard (HIPERLAN/2, IEEE802.11a, MMAC etc). A suitable value for T in HIPERLAN/2 would be 0.4 (auto-correlation circuit normalised output) and 32 for $N_m$.

When the output from the combined magnitude and phase auto-correlation of symbols (the A and B symbols from HIPERLAN/2 in this example) meet the correct conditions, the position of the first maximum (i.e. the A peak) is used to indicate when the preamble begins, and when the OFDM symbols carrying data start in the frame. For HIPERLAN/2, in an ideal channel without noise or multipath, the maximum would be situated 64 samples after the beginning of the preamble.

Once the position of the preamble has been accurately detected, the remainder of the receiver processing, such as frequency synchronization, sample clock synchronization and data demodulation may proceed.

In the case of the ULCH preamble shown in FIG. 9, the input selector 19 presents the following values to the inputs I1 to 5 of state machine 20:

$I1 = O3 = (|Auto(n)| + |Auto(n-80)|)/2$ $I2 = O2 = |Auto(n-80)|$ $I3 = O1 = |Auto(n)|$ $I4 = (Np - O5) = Np - P(n-80)$ $I5 = O4 = P(n)$ Thus, the state machine will be checking for the maximum value 70 of the (|Auto(n)|+|Auto(n−80)|)/2 peak after the state machine has first determined that the auto-correlation value shown at 72 and the delayed auto-correlation value at 74 exceed the threshold T, and the phase value at 76 and the delayed phase value at 78 are both equal to 0.

With regard to the USCH preamble of FIG. 10, the input selector 19 is arranged to provide the following values to the inputs I1 to I5:

$I1 = O1 = |Auto(n)|$ $I2 = 2 \times T$ $I3 = 2 \times T$ $I4 = Np$ $I5 = O4 = P(n)$ Thus, conditions 2, 3 and 4 tested at step 1012 are always met. The state machine will generate a signal indicating that the USCH preamble has been detected in response to the peak 80 of the auto-correlation value, assuming that the phase value 82 at this point is equal to 0.

Preferably, the state machine is arranged to detect ULCH and USCH preambles only when other conditions indicate that they may appear (for example after first detecting a broadcast burst preamble).

In the case of wireless local area networks, in conventional arrangements reliable and accurate preamble detection is rendered difficult, as the signals are not transmitted continuously. The present invention mitigates these problems. The techniques could be used in other situations in which similar conditions apply, such as satellite burst mode communications and burst mode power line communications.

The invention may be implemented using discrete hardware or a programmed microprocessor.

The invention claimed is:

1. A method of detecting within a received signal a predetermined complex data sequence that includes at least two periods, each of which gives rise to a peak in an auto-correlation output, the method comprising:
    (a) performing an auto-correlation on the data extracted from the received signal to provide a first auto-correlation output;
    (b) deriving a second auto-correlation output which is delayed by a predetermined delay amount being greater than zero and corresponding to the delay or delays between the peaks with respect to the first auto-correlation output;
    (c) combining the first auto-correlation output with the second auto-correlation output to produce a combined output; and
    (d) providing a signal representing the predetermined complex data sequence when the combined output meets a predetermined condition.

2. A method as claimed in claim 1, wherein the signal representing the predetermined complex data sequence is provided in dependence upon a signal representing the phase of the auto-correlation output.

3. A method as claimed in claim 2, wherein the signal representing the phase of the auto-correlation output is limited to two values, the value being selected according to whether said phase is less than $\pi/2$.

4. A method as claimed in claim 2 or claim 3, wherein the signal representing the predetermined complex data sequence is provided in dependence upon the phase of the auto-correlation output at different times.

5. A method as claimed in claim 1, wherein the predetermined criterion is met when the combined output exceeds a threshold.

6. A method as claimed in claim 1, wherein the predetermined complex data sequence comprises a first data pattern and a second data pattern delayed with respect to the first data pattern by an amount corresponding to the delay applied to the auto-correlation output.

7. A method as claimed in claim 1, wherein the predetermined complex data sequence comprises a patter of subsequences which are either identical to each other or the inverse of each other.

8. A method as claimed in claim 1, wherein the received signal comprises OFDM symbols.

9. A method as claimed in claim 1, wherein the received signal is a HIPERLAN/2 signal.

10. An apparatus for detecting within a received signal a predetermined complex data sequence that includes at least two periods, each of which gives rise to a peak in an auto-correlation output, the apparatus comprising:
   an auto-correlator for auto-correlating data in the received signal to provide a first auto-correlation output;
   a delay unit for delaying the first auto-correlation output by a predetermined amount being greater than zero and corresponding to the delay or delays between the peaks to provide a second auto-correlation output; and
   a processor responsive to the output of the delay unit and the output of the auto-correlator for determining the presence of the predetermined complex data sequence in said data.

11. A wireless LAN receiver comprising the apparatus of claim 10 for detecting preambles in transmitted burst signals.

12. Apparatus as claimed in claim 10, further comprising:
   a phase detector that detects the phase of an output from the auto-correlator; and
   wherein the processor is also responsive to an output of the phase detector.

13. Apparatus as claimed in claim 10 or 12, further comprising:
   an input selector that provides multiple outputs, including the outputs from said auto-correlator and said delay unit; and
   wherein the processor includes a state machine having a plurality of inputs and configuration means for selectively changing the coupling between said multiple outputs and said multiple inputs so as to alter the configuration of the processor and thereby render the state machine operable to detect different predetermined data sequences.

14. A method of detecting a predetermined complex data sequence in a received signal, the method comprising:
   (a) performing an auto-correlation on the data extracted from the received signal to provide a first auto-correlation output comprising successive auto-correlation values;
   b) deriving a second auto-correlation output comprising successive auto-correlation values each delayed by a predetermined delay amount, greater than zero, with respect to the first auto-correlation output;
   (c) combining the first auto-correlation output with the second auto-correlation output to produce a combined output; and
   (d) providing said signal representing the predetermined complex data sequence when the combined output meets a predetermined condition.

* * * * *